United States Patent
Shank et al.

(10) Patent No.: US 6,629,112 B1
(45) Date of Patent: Sep. 30, 2003

(54) RESOURCE MANAGEMENT FOR CORBA-BASED APPLICATIONS

(75) Inventors: Clarles Kevin Shank, Austin, TX (US); R. Alberto Villarica, Fairport, NY (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/223,973

(22) Filed: Dec. 31, 1998

(51) Int. Cl.[7] .............................................. G06F 17/00
(52) U.S. Cl. ...................... 707/206; 707/103 R; 707/10
(58) Field of Search ..................... 707/1–206

(56) References Cited

U.S. PATENT DOCUMENTS

| | | | | |
|---|---|---|---|---|
| 5,913,216 A | * | 6/1999 | Kneuer et al. | 707/206 |
| 5,915,253 A | * | 6/1999 | Christiansen | 707/4 |
| 5,918,235 A | * | 6/1999 | Kirshenbaum et al. | 707/3 |
| 6,473,781 B1 | * | 10/2002 | Skagerwall et al. | 707/10 |
| 6,480,862 B1 | * | 11/2002 | Gall | 707/205 |
| 6,480,863 B1 | * | 11/2002 | Scheifler et al. | 707/10 |

OTHER PUBLICATIONS

Jones et al., "Garbage Collection, Algorithms for Automatic Dymamic Memory Management", 1996, John Wiley and Sons, pp. 10, 43.*

Sultan et al., Lazy garbage collection of recovery state for fault–tolerant distributed shared memory, Parallel and Distributed Systems, IEEE Transactions on, vol. 13, Issue 10, Oct. 2002, pp. 1085–1098.*

Xu et al., Cost–effective flow table designs for high–speed routers: architecture and performance evaluation, Computers, IEEE Transactions on, vol. 37, Issue 9, Sep. 2002, pp. 1089–1099.*

Hu et al., Rapid–Cache–A reliable and inexpensive write cache for high performance storage systems, Parallel and Distributed Systems, IEEE Transactions on, vol. 13, Issue 3, Mar. 2002, pp. 290–307.*

* cited by examiner

Primary Examiner—David Jung
(74) Attorney, Agent, or Firm—Withrow & Terranova, PLLC

(57) ABSTRACT

To provide resource management in a distributed object-oriented client/server computer system, resources allocated on a server on behalf of processes running on a client are recovered when the processes on the client no longer need to access the resource or when they terminate normally or abnormally. Reference counting is used on the server in combination with the use of smart proxies on the client so that resources on the server can be recovered.

27 Claims, 6 Drawing Sheets

RESOURCE MANAGEMENT FOR CORBA-BASED APPLICATIONS

BACKGROUND OF THE INVENTION

The present invention relates to a method and system for resource management in a distributed object architecture and, more particularly, to a method and system for recovering resources allocated on a server on behalf of processes running on a client when the processes on the client no longer need to access the resource or when they terminate normally or abnormally.

Common Object Request Broker Architecture (CORBA) is an industry standard architecture developed by the Object Management Group (OMG) for object-oriented computing in a distributed environment. A CORBA-based system is composed of cooperating objects on a software bus, which is called the object request broker (ORB). Each object has an interface, which in CORBA is an abstract, language-independent representation of the set of methods that can be understood by the object. Method invocations on remote objects occur through an underlying protocol, which can be specific to an ORB vendor or based on an industry standard. The ORB enables objects to make requests and receive responses transparently in a distributed environment.

CORBA 2.0 specifies an interoperability protocol, Internet Inter-ORB Protocol (IIOP), that allows objects implemented using one vendor's ORB to communicate with an object using another vendor's ORB. An application developer is shielded from all details of the lower-level interaction, including the locations of the objects and the marshaling (i.e., encoding to convert interfaces and parameters into flattened message formats to transfer over a network) and unmarshalling (i.e., decoding) of arguments.

Interface Definition Language (IDL) is essential to interoperability of components in a CORBA system. IDL is a neutral intermediate language that specifies a component's boundaries, interfaces with potential clients, or any description of a resource or service that the server component wants to expose to a client. IDL is not a programming language; it is instead a language for expressing interface types.

Several commercial implementations of the CORBA standard exist. Orbix, developed by Iona Technologies, is one such implementation that may be used in methods and systems consistent with the present invention. Orbix consists of a CORBA 2.0-compliant object request broker (ORB), an IDL compiler, and related tools. The ORB mediates between clients and implementations of application objects and must provide a standard interface to such clients, and another to such implementations of application objects. The CORBA standard does not specify whether the ORB is a set of runtime libraries, a set of daemon processes, a server machine, or part of an operating system.

Orbix is implemented as a pair of libraries—one for client applications and one for servers—and the orbixd daemon. The orbixd daemon need only be present at nodes running CORBA servers, and it is responsible for launching server processes dynamically. Because of the library implementation of Orbix ORB, there is no central component through which all object requests must pass. Instead, object requests pass directly from the client (application) code to the invoked server object implementation. If the server and client are in different processes, the method invocation is marshalled in the client process, transmitted over an IP network, unmarshalled in the server process, and dispatched to the appropriate server object by the object adaptor. The role of orbixd is to connect clients and servers for the first time. Since Orbix adheres to IIOP, the Orbix ORB can interoperate with any other ORB that also supports the standard IIOP.

Another important component of Orbix is its compiler technology, which translates CORBA IDL into programming language code, e.g., C++, that performs remote calls. The generated code is sufficiently sophisticated so that developers are not burdened with extra programming steps after translation.

According to CORBA standards, a client may request that a server-side object be created on a server. The server-side object provides a service to its clients through the ORB. When the client no longer needs access to the server-side object, the object should be destroyed. Otherwise, if a client crashes, the objects created on its behalf on the server are abandoned. These server-side objects consume finite operating system (OS) resources (e.g., memory). Without proper management, the server process hosting the server-side objects would eventually run out of available OS resources. The CORBA standards, however, do not address this issue of distributed resource management, i.e., there is no specified method or technique for deleting server-side objects when they are no longer needed by a client. This is because the resource management model of CORBA is based on reference counting on the client side and server side separately, with no interaction between them.

SUMMARY OF THE INVENTION

The present invention provides a method for resource management in a CORBA environment that uses smart proxies, a feature of certain CORBA implementations, in connection with reference counting logic on the server to track objects allocated for clients. When a client explicitly releases an object, exits, or crashes, methods consistent with the present invention remove objects that are no longer necessary.

A method consistent with the present invention manages resources in a distributed object-oriented client/server computer system having a garbage collector by receiving at the server a request from the client to create an object, creating the object on the server in response to the request, setting a reference count of the object to one, registering the object with the garbage collector, storing a reference to the object in the garbage collector, thereby incrementing the reference count by one, and returning the reference to the object from the server to the client, thereby decrementing the reference count of the object by one.

Another method consistent with the present invention manages resources by receiving at the server an object-oriented, language-independent message from the client that the client has a reference to the object, determining whether the object was created by the client, incrementing the reference count of the object by one if the object was not created by the client, and storing a reference to the object in the garbage collector if the object was not created by the client.

Another method consistent with the present invention manages resources by receiving at the server a notification that a client has crashed, determining from a table corresponding to the client which objects are used by the client, releasing the objects used by the client, thereby decrementing by one the reference count of the objects used by the client, and removing from the garbage collector the table corresponding to the client.

Yet another method consistent with the present invention manages resources by receiving at the server an object-oriented, language-independent request from the client to delete an object, de-registering the object with the garbage collector, releasing the object, thereby decrementing the reference count of the object by one, and removing from the garbage collector the reference to the object.

Additional features and advantages of the present invention will be readily appreciated by one of ordinary skill in the art from the following detailed description of the best mode for carrying out the invention when taken in connection with the accompanying drawings.

DETAILED DESCRIPTION OF THE PREFERRED EMBODIMENTS

Figure 1:
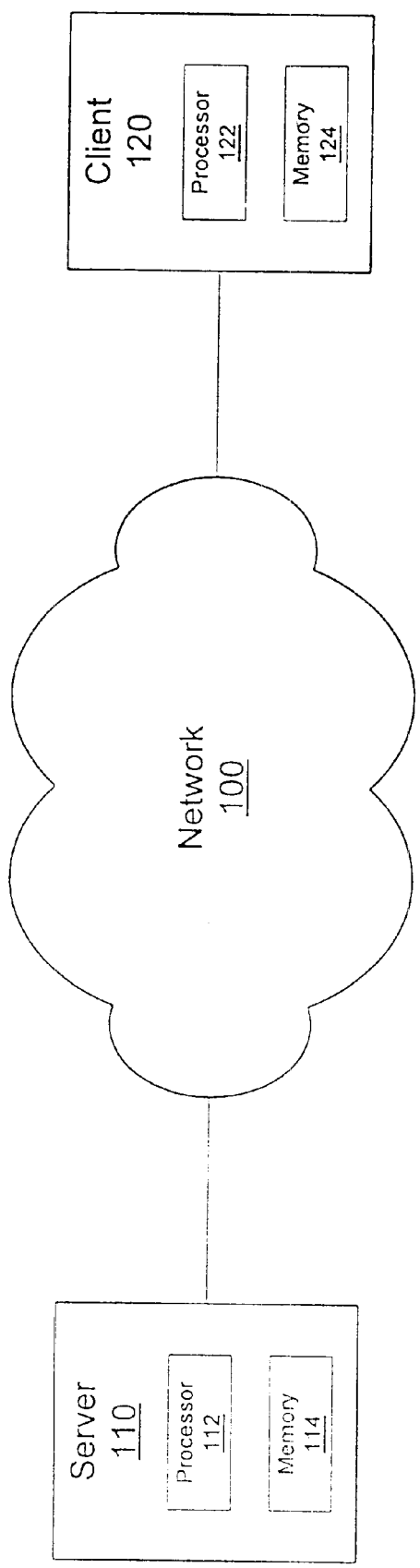
FIG. 1 is a high-level block diagram of an Internet Protocol (IP) network in which a method consistent with the present invention may operate.

FIG. 1 illustrates a high-level block diagram of IP network 100 in which a method consistent with the present invention may operate. Server 110 is coupled to network 100. Server 110 may be part of a node or switch included in network 100, or server 110 may be a separate physical entity. Furthermore, server 110 does not have to be collocated with a node or switch of network 100. Additionally, server 110 may itself be distributed among several nodes coupled to network 100 at different locations. Consistent with the present invention, server 110 provides an interface to resources located anywhere in network 100. Client 120, coupled to network 100, utilizes the interface provided by server 110 to request server 110 to create objects on its behalf.

Server 110 and client 120 include processors 112 and 122, respectively, and memories 114 and 124, respectively. Processors 112 and 122 may be provided by conventional microprocessor circuits. Memories 114 and 124 may include both RAM and ROM portions and may be implemented with any type of computer-readable medium, such as any electronic, magnetic, or optical read/write storage device. Memories 114 and 124 store data that serves as instructions to processors 112 and 122, respectively, and which, when executed by processors 112 and 122, cause server 110 and client 120 to carry out methods that are described below.

Figure 2:
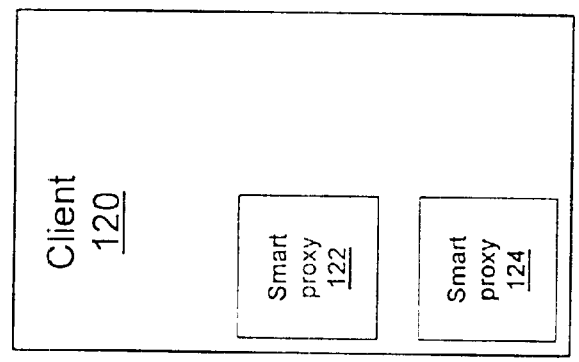
FIG. 2 illustrates a high-level block diagram of internal software and memory components of a server and client consistent with the present invention.
Figure 2:
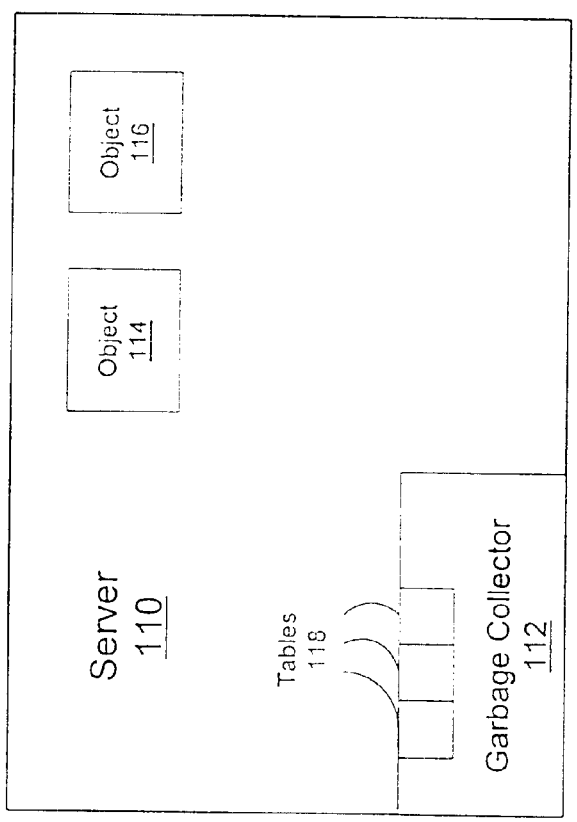

FIG. 2 illustrates a high-level block diagram of internal software and memory components of server 110 and client 120. Consistent with the present invention, garbage collector 112 manages resources by keeping track of objects, such as objects 114 and 116 shown in FIG. 2, and which clients require access to them. Garbage collector 112 stores this information in tables 118. Objects 114 and 116 communicate with garbage collector 112 to inform garbage collector 112 of their use by clients. Each object has a reference count associated with it for tracking the number of references to the object. Also consistent with the present invention, client 120 creates smart proxies, such as smart proxies 122 and 124 shown in FIG. 2, in its address space when receiving a reference to an object created on server 110. Smart proxies, in addition to standard proxies, are available in certain CORBA implementations, including Orbix. Standard proxies are responsible for performing the marshalling of a method invocation and the unmarshalling of the result of the method invocation. A smart proxy allows a software developer to add code that gets executed when the smart proxy gets created/destroyed or when a method is invoked. This facility makes a distributed resource management technique consistent with the present invention transparent to a developer of clients such as client 120.

Interface

Consistent with the present invention, an object on server 110 that needs to be tracked implements the following CORBA interface, described in IDL:

```
interface AutoReleasable {
    oneway void reference();
    oneway void release();
};
```

The interface includes two methods: reference( ) and release( ). As described in more detail below, the method reference( ) tells garbage collector 112 that a particular client has reference to the object invoking the method. The method release( ) tells garbage collector 112 that a particular client no longer needs access to the object.

Distributed Reference Counting

Figure 3:
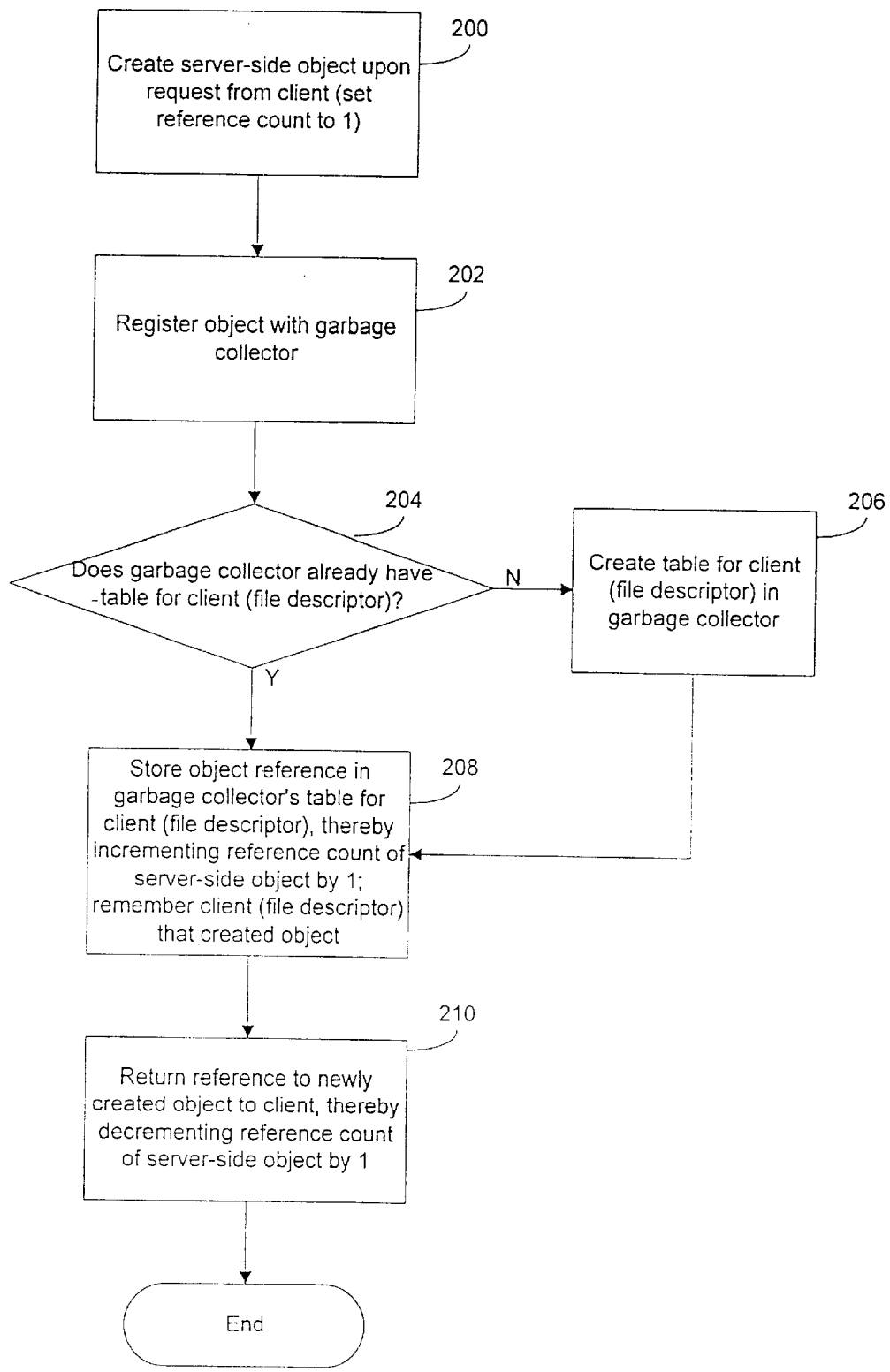
FIG. 3 illustrates a method for creating objects on a server consistent with the present invention.
Figure 4:
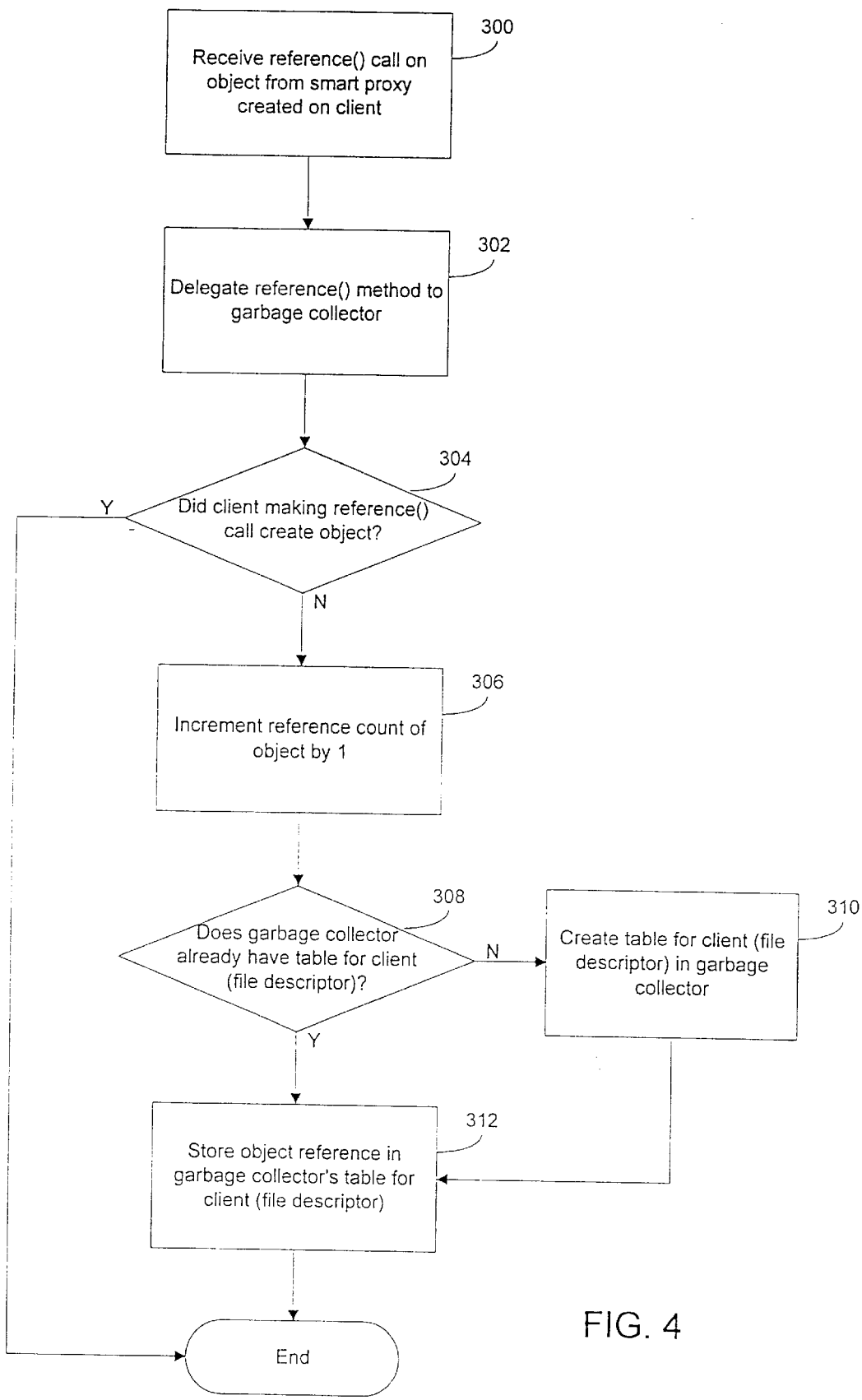
FIG. 4 illustrates a method for managing information stored on a server consistent with the present invention.

Consistent with the present invention, a distributed reference counting scheme is used to track objects and the clients that require access to them. FIG. 3 illustrates a process for creating objects on a server at the request of a client; FIG. 4 shows a process for receiving reference( ) calls at the server from the client. By implementing these processes, a server has the capability to destroy objects that are no longer needed by clients when, for example, a client crashes or a client tells the server that it no longer needs access to the object.

FIG. 3 illustrates a method for creating objects on server 110 consistent with the present invention. When client 120 would like an object created on the server, client 120 requests server 110 to create a server-side object. Server 110 receives the request from client 120, creates an object, object 114 for example, and sets the reference count of object 114 to 1, because client 120 now has a reference to object 114 (step 200). Server 110 then registers object 114 with garbage collector 112.

Upon registration of object 114, garbage collector 112 stores a reference to object 114 in its memory and stores an indication that client 120 created object 114. The act of storing the reference to object 114 by the garbage collector increments the reference count of object 114 by 1. Clients are known to servers through a file descriptor, so any communication between a particular client and a particular server goes through a unique file descriptor. Consistent with the present invention, garbage collector 112 includes tables 118 for storing references to objects. In one embodiment consistent with the present invention, garbage collector 112 maintains a separate table for each client that has requested objects to be created. FIG. 3 illustrates this embodiment. It should be apparent to one skilled in the art that other embodiments consistent with the present invention exist for storing references to objects. For example, in another embodiment consistent with the present invention, garbage collector 112 contains a single table or memory for storing object references for all active clients.

With continuing reference to FIG. 3, garbage collector 112 determines whether it already contains a table for client 120, represented by the file descriptor used between client 120 and server 110 (step 204). If there is no table, flow continues to step 206, in which garbage collector 112 creates a table for client 120 using its field descriptor. Once a table is created, or if the table already existed, garbage collector 112 stores a reference to object 114 in the table for client 120, also noting that client 120 is the client that created object 114 (step 208). The act of storing the reference to object 114 also increments the reference count of object 114 by 1. Server 110 then returns a reference to newly created object 114 to client 120 and decrements the reference count of object 114 by 1 by automatically calling the CORBA::release( ) method on object 114 (step 210). This step completes the object creation process from the point of view of server 110.

Consistent with the present invention, whenever client 120 receives an object reference, client 120 creates a smart proxy for the object and initiates a reference( ) call on the object. The present invention makes this distributed reference counting scheme transparent to developers of clients such as client 120 by using smart proxies to call reference( ) upon construction, and release( ) upon destruction. Client 120 receives an object reference after creating a new object, as shown in step 210 of FIG. 3. Client 120 may also receive an object reference passed from another client, not shown. This occurs, for example, if client 120 uses the object as an argument to a method that client 120 is invoking on an object in the second client.

FIG. 4 illustrates a method from the point of view of server 110 for managing information stored in garbage collector 112 after a smart proxy, e.g., smart proxy 122, created by client 120 calls reference( ) on an object, e.g., object 114, on server 110. First, server 110 receives the reference( ) call on object 114 from smart proxy 122 on client 120 (step 300). Object 114 delegates responsibility for the reference( ) method to garbage collector 112 (step 302). Next, garbage collector 112 determines, based on information stored in tables 118, whether client 120 initially created object 114 (step 304). If so, the process is completed because garbage collector 112 has all necessary information regarding the relationship between client 120 and object 114. If not, server 110 increments the reference count of object 114 by 1, because garbage collector 112 will now have a reference to object 114 for client 120 (step 306). To create this reference, garbage collector 112 determines whether it already has a table for client 120 (step 308). If it does not, garbage collector creates a table for client 120 (step 310). Once a table is created, or if it already existed, garbage collector 112 stores a reference to object 114 in the table for client 120 (step 312), completing the process for receiving a reference( ) call at server 110 from client 120.

Release of Objects

Figure 5:
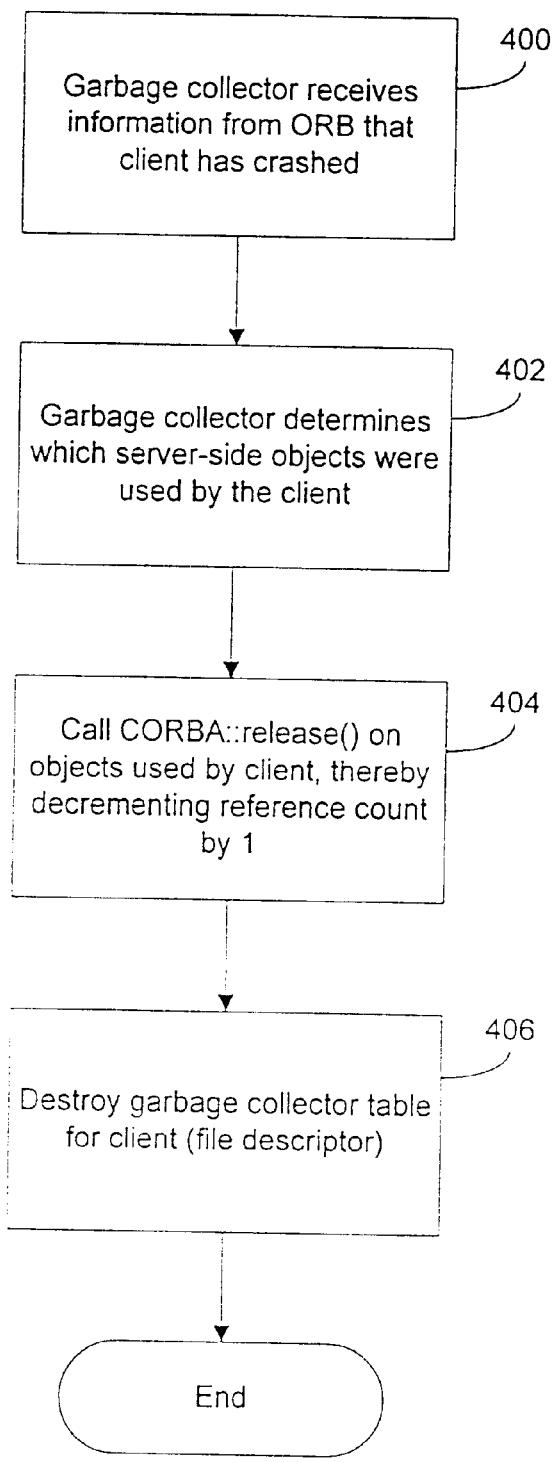
FIG. 5 illustrates a method for managing resources on the server when a client crashes consistent with the present invention.
Figure 6:
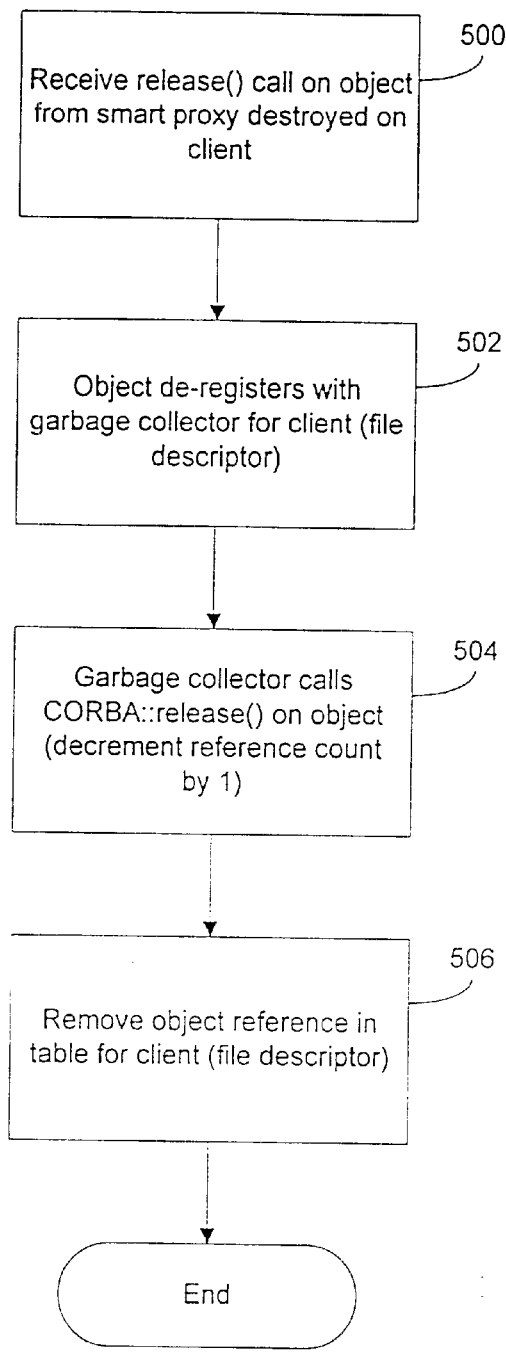
FIG. 6 illustrates a method for managing resources when a client informs a server that it no longer needs access to a server-side object.

If reference counts of objects are maintained as described in connection with FIGS. 3 and 4, then, consistent with the present invention, objects no longer needed by any clients will be destroyed if the processes shown in FIGS. 5 and 6 are followed when a particular client no longer needs access to an object.

FIG. 5 illustrates a method consistent with the present invention for managing resources on the server when a client crashes. When client, e.g., client 120, crashes, the ORB informs garbage collector 112 in server 110 that client 120 has crashed (step 400). Upon receiving this information, garbage collector 112 determines, by searching its tables, which objects on server 110 were used by client 120 (step 402). Garbage collector 112 then calls CORBA::release( ) on any objects that were used by client 120 (step 404). This decrements the reference counts of all such objects by 1. Garbage collector 112 destroys its table for client 120 because client 120 is no longer active (step 406).

Any time an object's reference count goes to 0, the server destroys the object because no clients require access to it. Thus, after step 404 of FIG. 5, if client 120 was the only client with a current reference to object 114, the reference count of object 114 goes to 0, and the server destroys object 114. On the other hand, if another client currently has a reference to object 114, the reference count of object 114 decreases to 1 after step 404, so the server does not destroy the object.

FIG. 6 illustrates a method consistent with the present invention for managing resources when client 120 informs server 110 that it no longer needs access to object 114. When client 120 determines that it no longer needs object 114, it destroys its smart proxy for object 114. In CORBA, this is done by calling CORBA::release( ) on the CORBA reference. Destroying the smart proxy results in the smart proxy calling release( ) on object 114 on server 110. Server 110 receives the release( ) call (step 500), and object 114 de-registers with garbage collector 112 for use with client 120 (step 502). In response, garbage collector 112 calls CORBA::release( ) on object 114, thereby decrementing its reference count by 1 (step 504). Garbage collector 112 removes its reference to object 114 from the table for client 120 (step 506). Even if object 114 was the only object being used by client 120, garbage collector 112 does not remove the table associated with client 120 because client 120 is still active and may wish to use other objects on server 110.

Once again, if the reference count of object 114 goes to 0 as a result of step 504, the server destroys object 114. On the other hand, if another client currently has a reference to object 114, the reference count of object 114 decreases to 1 after step 404, so the server does not destroy the object.

As a result of the reference counting scheme described in connection with FIGS. 3 and 4, and the object release scheme described in connection with FIGS. 5 and; 6, a server knows when server-side objects are no longer needed by any clients, and the server can destroy those objects. This enables the server to recover resources that had been allocated to remote clients but is no longer being used.

It will be appreciated by those skilled in this art that various modifications and variations can be made to the resource management methods described herein without departing from the spirit and scope of the invention. Other embodiments of the invention will be apparent to those skilled in this art from consideration of the specification and practice of the invention disclosed herein. It is intended that the specification and examples be considered exemplary only, with a true scope and spirit of the invention being indicated by the following claims.

We claim:

1. A method for managing resources in a distributed object-oriented computer system having a plurality of clients and a server having a garbage collector, the method comprising the steps of:

receiving at the server a request from one of the clients to create an object;

creating the object on the server in response to the request;

setting a reference count of the object;

registering the object on the server, wherein registering comprises registering the object with the garbage collector;

storing a reference to the object on the server, wherein storing comprises storing a reference to the object in the garbage collector;

returning the reference to the object from the server to the clients; and allowing the object to be called by multiple ones of the plurality of clients.

2. The method of claim 1 wherein the storing step further includes the substeps of determining whether the garbage collector includes a table corresponding to the client;

creating a table corresponding to the client if the garbage collector does not include a table corresponding to the client; and storing a reference to the object in the table corresponding to the client.

3. The method of claim 1 wherein the step of setting a reference count includes the substep of setting a reference count to one.

4. The method of claim 1 wherein the storing step includes the substep of incrementing the reference count of the object by one, and wherein the returning step includes the substep of decrementing the reference count of the object by one.

5. The method of claim 1 wherein allowing the object to be called by multiple ones of the plurality of clients comprises:

receiving at the server an object-oriented, language independent message from a second client that the second client has a reference to the object;

determining whether the object was created by the second client;

incrementing the reference count of the object if the object was not created by the second client; and storing a reference to the object on the server if the object was not created by the second client.

6. The method of claim 5 wherein the storing step of claim 5 includes the substep of storing a reference to the object in the garbage collector.

7. The method of claim 6 wherein the step of storing a reference includes the substeps of determining whether the garbage collector includes a table corresponding to the second client;

creating a table corresponding to the second client if the garbage collector does not include a table corresponding to the second client; and storing a reference to the object in the table corresponding to the second client.

8. The method of claim 5 wherein the incrementing step includes the substep of incrementing the reference count of the object by one.

9. The method of claim 1 further comprising:

receiving at the server an object-oriented, language independent request from one of the clients to delete the object;

de-registering the object with the garbage collector;

releasing the object; and removing from the garbage collector the reference to the object.

10. The method of claim 9 wherein the releasing step includes the substep of decrementing the reference count of the object.

11. A method for managing resources in a distributed object-oriented computer system having a plurality of clients and a server, the server having a garbage collector and an object accessible by the plurality of clients, said object having a reference count, and the garbage collector having tables corresponding to the clients identifying whether the object is used by individual ones of the plurality of clients, the method comprising the steps of:

receiving at the server a notification that one of the clients have crashed;

determining from the tables whether the object was used by the client that crashed;

incrementing the reference count by one for each client within the plurality of clients that accesses the object;

releasing the object if the object was used by the client that crashed; and proactively removing from the garbage collector the table corresponding to the client that crashed.

12. The method of claim 11 wherein the releasing step includes the substep of decrementing the reference count of the object.

13. The method of claim 12 further comprising the step of deleting the object if its reference count is zero after the releasing step.

14. A server in a distributed object-oriented computer system adapted to serve a plurality of clients, said server comprising:

a garbage collector;

means for receiving a request from one of the clients to create an object on the server;

means for creating the object on the server in response to the request;

means for setting a reference count of the object;

means for registering the object on the server, wherein said registering means comprises means for registering the object with the garbage collector;

means for storing a reference to the object on the server, wherein said storing means comprises means for storing a reference to the object in the garbage collector;

means for returning the reference to the object from the server to the client; and means for allowing the object to be called by multiple ones of the plurality of clients.

15. The server of claim 14 wherein the storing means further comprises means for determining whether the garbage collector includes a table corresponding to the client;

means for creating a table corresponding to the client if the garbage collector does not include a table corresponding to the client; and means for storing a reference to the object in the table corresponding to the client.

16. The server of claim 14 wherein the setting means includes means for setting a reference count to one.

17. The server of claim 14 wherein the storing means includes means for incrementing the reference count of the object by one, and wherein the returning means includes means for decrementing the reference count of the object by one.

18. The server of claim 14, further comprising:

means for receiving at the server an object-oriented, language independent message from a second client that the second client has a reference to the object;

means for determining whether the object was created by the second client;

means for incrementing the reference count of the object if the object was not created by the second client; and means for storing a reference to the object on the server if the object was not created by the second client.

19. The server of claim 18 wherein the storing means comprises means for determining whether the garbage collector includes a table corresponding to the second client;

means for creating a table corresponding to the second client if the garbage collector does not include a table corresponding to the second client; and means for storing a reference to the object the table corresponding to the second client.

20. The server of claim 18 wherein the incrementing means includes means for incrementing the reference count of the object by one.

21. The server of claim 14, further comprising:

means for receiving an object-oriented, language independent request from a client to delete the object;

means for de-registering the object with the garbage collector;

means for releasing the object, thereby decrementing the reference cont of the object; and means for removing from the garbage collector the reference to the object.

22. The server of claim 21 wherein the releasing means includes means for decrementing the reference count of the object.

23. A server in a distributed object-oriented computer system, said server adapted to serve multiple clients, said server comprising:

an object having a reference count;

a garbage collector having one or more tables corresponding to different ones of said multiple clients and each table identifying whether the object is used by a particular client;

means for receiving a notification that one of the multiple clients has crashed;

means for determining from the tables whether the object was used by the client that crashed;

means for incrementing the reference count by one for each client within the multiple clients that accesses the object;

means for releasing the objects if the object was used by the client that crashed; and means for proactively removing from the garbage collector the table corresponding to the client that crashed.

24. The server of claim 23 wherein the releasing means includes means for decrementing the reference count of the object.

25. The server of claim 24 further comprising means for deleting the object if its reference count is zero after being released.

26. A computer readable medium comprising software adapted to work on a server in a distributed object-oriented computer system having a plurality of clients and a garbage collector, said software further adapted to:

receive a request from one of the clients to create an object;

create the object on the server in response to the request;

set a reference count of the object;

register the object on the server, wherein registering comprises registering the object with the garbage collector;

store a reference to the object on the server, wherein storing comprises storing a reference to the object in the garbage collector;

return the reference to the object from the server to the clients; and allow the object to be called by multiple ones of the plurality of clients.

27. A computer readable medium comprising software adapted to work on a server in a distributed object-oriented computer system having a plurality of clients and a garbage collector, said software further adapted to:

create an object having a reference count;

create tables in the garbage collector corresponding to the clients and identifying whether the object is used by individual ones of the plurality of clients;

receive a notification that one of the clients has crashed;

determine from tables whether the object was used by the client that crashed;

increment the reference count by one for each client within the plurality of clients that accesses the object;

release the object if the object was used by the client that crashed; and proactively remove from the garbage collector the table corresponding to the client that crashed.

* * * * *